(12) United States Patent
Bankstahl (10) Patent No.: US 7,377,825 B2
(45) Date of Patent: May 27, 2008

(54) HIGH-POWER ELECTRICAL QUICK CONNECTOR

(75) Inventor: Herbert A. Bankstahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 249 days.

(21) Appl. No.: 10/711,475

(22) Filed: Sep. 21, 2004

(65) Prior Publication Data

US 2006/0063396 A1    Mar. 23, 2006

(51) Int. Cl.
*H01R 39/00* (2006.01)

(52) U.S. Cl. ...................... 439/889; 439/337

(58) Field of Classification Search ............ 439/11, 439/282, 253, 809, 889, 801, 665
See application file for complete search history.

(56) References Cited

U.S. PATENT DOCUMENTS

| | | | | |
|---|---|---|---|---|
| 2,742,622 | A | * | 4/1956 | Stevens, Jr. ................ 439/282 |
| 3,297,975 | A | * | 1/1967 | Pope ......................... 439/282 |
| 3,491,329 | A | * | 1/1970 | Lecocq ...................... 439/263 |
| 3,736,548 | A | * | 5/1973 | Double ....................... 439/166 |
| 3,982,808 | A | | 9/1976 | Marechal |
| 4,270,824 | A | | 6/1981 | Erickson |
| 4,278,312 | A | | 7/1981 | Buffa |
| 4,702,539 | A | * | 10/1987 | Cusick et al. ............... 439/588 |
| 4,722,694 | A | | 2/1988 | Makal et al. |
| 5,002,500 | A | | 3/1991 | Zuccaro et al. |
| 5,051,539 | A | | 9/1991 | Leathers-Wiessner |
| 5,266,041 | A | | 11/1993 | De Luca |
| 5,338,917 | A | | 8/1994 | Stuart et al. |
| 5,902,150 | A | | 5/1999 | Sigl et al. |
| 6,050,855 | A | | 4/2000 | Varreng et al. |
| 6,193,548 | B1 | | 2/2001 | Sigl et al. |
| 6,489,554 | B1 | | 12/2002 | Bertini et al. |

FOREIGN PATENT DOCUMENTS

| | | |
|---|---|---|
| DE | 19631090 A1 | 2/1998 |
| EP | 241121 * | 2/1987 |
| EP | 1081799 A2 | 3/2001 |
| GB | 1362273 A | 8/1974 |

* cited by examiner

*Primary Examiner*—Neil Abrams
*Assistant Examiner*—Phuongchi Nguyen
(74) *Attorney, Agent, or Firm*—Ziolkowski Patent Solutions Group, SC (57) ABSTRACT

A quick connector assembly for high power electrical applications and method of manufacturing a high-power quick connector assembly are disclosed. The quick connector assembly has a first connector and a second connector constructed to form an electrical connection that can be quickly coupled and decoupled. The first connector has a collar portion connectable to a welding cable and a stem portion having a shank section and a threaded section. The second connector has a recess constructed to receive the stem portion of the first connector and electrically engage both the shank portion and the threaded portion of the first connector.

35 Claims, 7 Drawing Sheets

HIGH-POWER ELECTRICAL QUICK CONNECTOR

BACKGROUND OF THE INVENTION

The present invention relates generally to welding-type devices, and more particularly, to a quick connector assembly for use therewith.

Welding-type devices generally have a power source configured to generate a power signal suitable for welding-type applications. This power signal is transmitted beyond the power source by connecting a pair of cables to the power source. One of the cables has a torch at an end thereof and another cable has a work clamp attached at an end thereof. The cables are of such length as to allow an operator to position the torch and work clamp proximate the work piece. Additionally, the cables provide an operator with flexibility in the positioning the work piece relative to the power source.

During a welding process, weld power is transmitted through the weld cables to the torch and work clamp. As an operator performs a welding process, the weld cable must often be repositioned during the welding process. An operator may inadvertently apply stresses to the connection between the weld cable and the power source during repositioning of the weld cables. Inadvertent overstressing of the connection can result in poor electrical connectivity between the weld cable and the power source. Poor electrical connectivity between the weld cable and the power source can detract from weld quality and result in wear between the components of the connection. Ultimately, the connection can be overstressed to a point of mechanical failure or disengagement. As such, the connection between the weld cable and the power source must be designed to withstand such inadvertent stresses.

While some connectors provide a relatively robust mechanical connection, such as by bolting the weld cable to the power source, such constructions are not without their drawbacks. Specifically, welding-type devices that require the weld cable be bolted to the power source detract from the ease of portability of such devices and the interchangeability of weld cables. The weld cables are often removed during transportation of the welding device in order to protect the electrical integrity of the weld cables. In order to move the welding-type device, the operator must not only remove the cables but must also acquire the tool/tools required to disengage the bolt from the power source. Similarly, if a particular welding application requires a longer set of cables, an operator must remove a first set of cables and connect a second set of longer cables. As such, in highly dynamic applications where the power source may be relocated several times a day or welding processes may be required at different distances from the welding device, repeatedly disconnecting and reconnecting the weld cables decreases the overall efficiency of welding operations.

In addition to the mechanical considerations, the connection between the power source and the weld cable must also be able to thermally and electrically support the transfer of the power signal suitable for welding through the connection. As the amount of current passed through the connection increases, the temperature of the components of the connection also increases and is indicative of power loss associated with the connection. Heat generated in the connection decreases the electrical efficiency of the connection. Additionally, if left unaddressed, the temperature of the connector can ultimately lead to failure of the connection or damage to other components of the welding-type device including the welding cables, the torch, the welding device housing, or the internal components of the welding-type device. As such, the connection between the weld cable and the power source may not only decrease the overall efficiency of the welding-type device but may also define a limit for the amount of welding power that can be communicated through the connection.

It would therefore be desirable to have a connector assembly that is quickly connectable to a welding-type device and can withstand the transfer of relatively high weld power signals therethrough.

BRIEF DESCRIPTION OF THE INVENTION

The present invention is directed to a connector assembly that solves the aforementioned problems. The present invention provides a connector assembly and method of manufacturing the same that allows a first connector to be quickly connected to and disconnected from a second connector. The connector is constructed to mechanically and electrically connect a weld cable to a welding-type device capable of generating relatively high power signals suitable for multiple welding applications.

Therefore, in accordance with one aspect of the present invention, a high-power quick connector assembly is disclosed having a first connector and a second connector. The first connector has a collar portion connectable to a welding cable and a stem portion having a shank end and a threaded end. The second connector has a recess formed therein constructed to receive the stem portion of the first connector. The recess is constructed to engage the shank end and the threaded end of the first connector.

According to another aspect of the present invention, a quick connector assembly for a welding-type device is disclosed. The quick connector assembly includes a cable adapter having a cable end connectable to a welding cable and a welding device end. A device adapter is constructed to engage the welding device end of the cable adapter and has a body having a first end and a second end. A recess extends into the body from the first end and has a threaded section formed in the recess proximate the first end. A smooth section is formed in the recess between the threaded section and the second end.

In accordance with another aspect of the present invention, a high-power quick connector assembly is disclosed having a receiver and a plug. The receiver is configured to be connected to a welding-type device and has a first inner diameter and a second inner diameter wherein the second inner diameter is greater than the first inner diameter. The plug is constructed to be connected to a weld cable and has a stud. The stud has a first outer diameter substantially similar to the first inner diameter of the receiver and a second outer diameter substantially similar to the second inner diameter of receiver. A plurality of threads is formed about the second outer diameter of the stud.

According to a further aspect of the present invention, a method of forming a high-power electrical connection is disclosed. The method includes providing a receptacle having a first connection portion and a second connection portion, providing a plug having a first engagement portion constructed to electrically communicate with the first connection portion of the receptacle and a second engagement portion constructed to electrically communicate with the second connection portion upon rotation therebetween, and wherein a surface area of the first engagement portion is less than a surface area of the second engagement portion.

According to yet another aspect of the present invention, a method of manufacturing a high-power quick connector assembly is disclosed. The method includes forming a receiver having a first internal profile and a second internal profile and forming a plug having a first external profile constructed to pass the second internal profile of the receiver and engage the first internal profile of the receiver and a second external profile constructed to engage the second internal profile of the receiver upon rotation therebetween.

In accordance with a further aspect of the present invention, a high-power quick connector assembly for welding-type apparatus is disclosed. The high-power quick connector assembly includes means for receiving a weld cable and means for connecting the receiving means to a power source. The connecting means includes first attaching means having a contact surface area and second attaching means having a contact surface area that is greater than the contact surface area of the first attaching means.

According to an even further aspect of the present invention, a connector assembly is disclosed having a cable connector and an output connector. The cable connector is connectable to a weld cable and the output connector is electrically connectable to a power source configured to generate a power signal suitable for welding applications. At least one of the cable connector and the output connector are constructed from a tellurium copper material.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
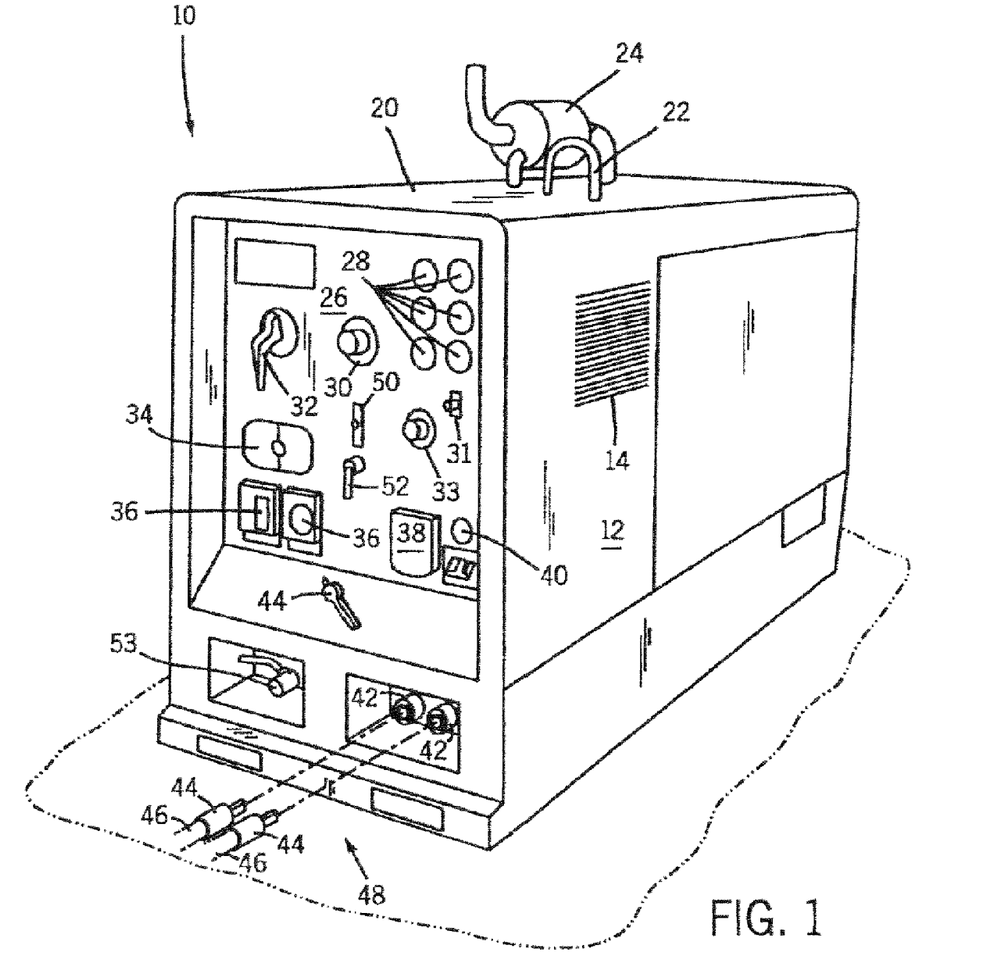
FIG. 1 is a perspective view of an exemplary welding-type device incorporating the present invention.

The present invention will be described with reference to a welder; however, it is understood that its application is not so limited. Referring now to FIG. 1, a portable engine-driven welder system 10 is provided and, for brevity, will hereinafter be referred to as the welding device 10. As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

The welding device 10 has an outer housing 12 that has one or more air vents 14 for cooling internal components of welding device 10. The housing 12 can be easily removed to permit access to the internal components for maintenance and service. An upper surface 20 of welding device 10 includes a lifting hook 22 extending therethrough for lifting and transporting of the welding device. Also attached to the upper surface 20 is an exhaust system 24 that lowers noise and passes exhaust gas from an engine of welding device 10 through housing 12. Welding device 10 is shown as being engine driven for exemplary purposes. It is understood that welding device 10 could be powered by an external power source such as a power grid.

The welding device 10 includes a control panel 26 that has various control elements and gauges for operating the welding device 10. A plurality of gauges 28 measure various parameters of the welding device 10. Measured parameters can include oil pressure, fuel level, oil temperature, battery amperage, air pressure, and engine running time of the welding device 10. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, gas metal arc welding, tungsten inert gas welding, air-carbon arc cutting, and various wire feed processes. Electrical outlets 36 provide power for electrically driven devices, such as saws, drills, etc. Control panel 26 also includes a compressor on/off switch 31 and an engine control switch 33 to independently control the compressor and engine, respectively.

The control panel 26 also includes multiple power connections such as a single phase power connect 38, an optional three-phase power connect 40, and weld-power receptacles 42. Weld cable connectors 44 are connected to welding cables 46 and are constructed to engage weld-power receptacles 42. Weld cables 46 electrically connect a torch and a work clamp to welding device 10. Weld-power receptacles 42 and weld cable connectors 44 form a connector assembly 48 for removably connecting weld cables 46 to welding device 10. An optional polarity switch 50 can be used to select the polarity of the weld output. Typical selections include direct current electrode negative, direct current electrode positive, and alternating current. A panel remote switch 52 and remote receptacle 53 select remote control of the welding device 10 in instances where welding operations are remotely located from the welding device 10.

Figure 2:
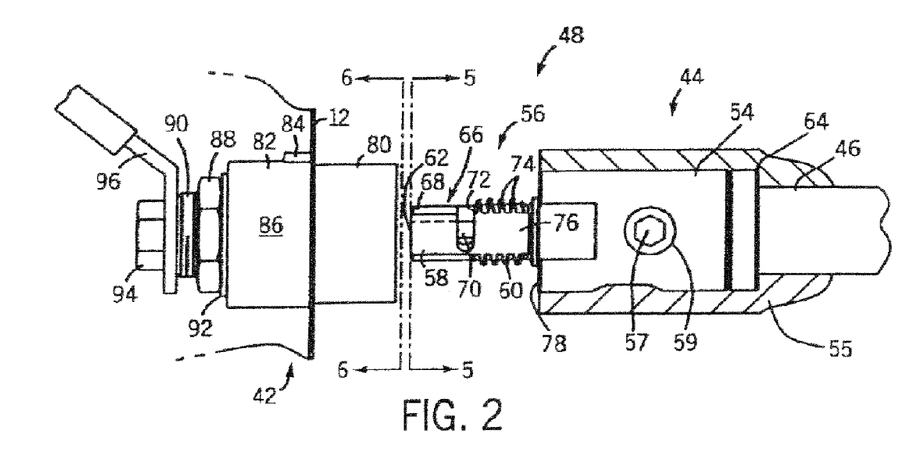
FIG. 2 is an elevation view of one embodiment of a quick connector assembly for use with the welding-type device shown in FIG. 1.

One embodiment of connector assembly 48 is shown in greater detail in FIG. 2. Weld cable connector 44, a first connector, has a collar portion 54 and a stem portion 56. Collar portion 54 is constructed to receive weld cable 46 therein and has an insulator 55 positioned thereabout. A set screw 57 is threadingly received in a threaded hole 59 formed through collar portion 54 and receives weld cable 46 therein. Insulator 55 positioned about connector 44 protects connector 44 from inadvertent electrical contact therewith when connector 44 is connected to receptacle 42. Stem portion 56 includes a shank portion 58 and a threaded portion 60. Shank portion 58 is located at an end 62 of weld cable connector 44 generally opposite another end 64 of weld cable connector. A groove 66 is formed in shank portion 58 and has a first section 68 extending generally longitudinally along shank portion 58 of weld cable connector 44. A second section 70 of groove 66 extends generally circumferentially about stem portion 56 at an interface 72 of shank portion 58 and threaded portion 60. Threaded portion 60 includes a plurality of threads 74 extending circumferentially thereabout. A pair of planar surfaces 76 extend longitudinally along shank portion 58 and threaded portion 60 from end 62 to a lip 78 between threaded portion 60 and collar portion 54 of weld cable connector 44. Planar surfaces 76 interrupt threaded portion 60 such that threads 74 do not extend continuously thereabout. Planar surfaces 76 also truncate shank portion 58 of stem portion 56. Receptacle 42 forms a second connector of connector assembly 48.

Figure 3:
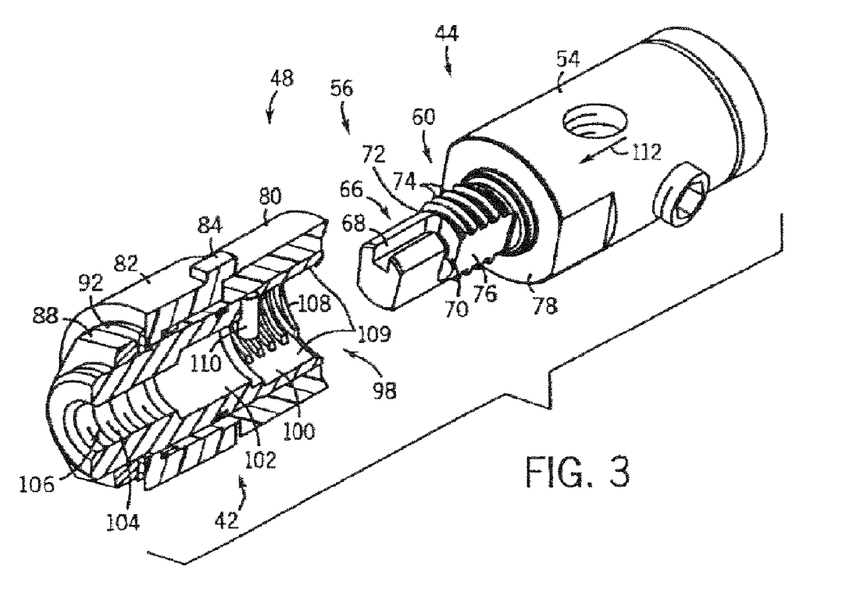
FIG. 3 is a perspective, partial cross-sectional view, of the quick connector assembly of FIG. 2.

Receptacle 42 includes a first collar 80 and a second collar 82 with housing 12 of welding device 10 positioned therebetween. A boss 84 extends from an outer surface 86 of second collar 82 and positions first collar 80 relative thereto. A nut 88 engages an outer threaded portion 90 of receptacle 42 and secures the receptacle to housing 12. A washer 92 is positioned between nut 88 and second collar 82 and prevents unintentional loosening of receptacle 42 from housing 12. A bolt 94 secures a clip 96 to receptacle 42. Clip 96 electrically connects receptacle 42 to a power source constructed to generate a welding-type power signal. A recess 98 is formed in receptacle 42 as shown in FIG. 3. Recess 98 includes a first section 100, a second section 102, and a third section 104. Third section 104 of recess 98 includes a plurality of threads 106 formed thereabout for receiving bolt 94 shown in FIG. 2. It is understood that, rather than receiving a solid bolt, third section 104 could receive a hollow adapter to allow circulation of a cooling flow through connector assembly 48.

As shown in FIG. 3, first section 100 of recess 98 has a threaded portion 108 interrupted by a pair of channels 109. Channels 109 extend across threaded portion 108 and divide it into a pair of threaded sections. A pin 110 extends into recess 98 generally between first section 100 and second section 102. As weld cable connector 44 is inserted into receptacle 42 in the direction of arrow 112, pin 110 engages groove 66 and moves along first section 68 of groove 66. Upon rotation of weld cable connector 44 relative to receptacle 42, pin 110 translates along second section 70 of groove 66 and threaded portion 60 of weld cable connector 44 engages threaded portion 108 of receptacle 42.

Figure 4:
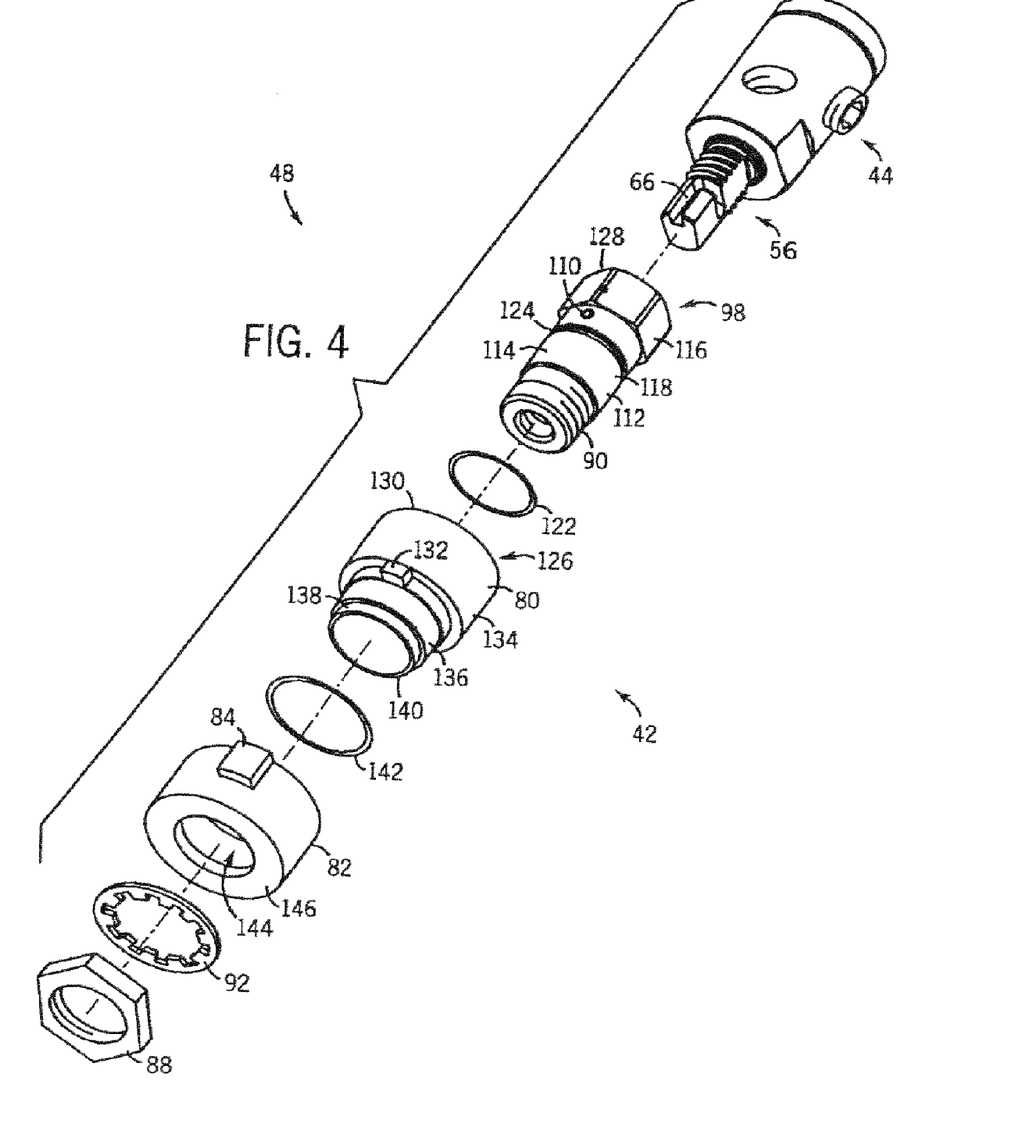
FIG. 4 is an exploded perspective view of the quick connector assembly of FIG. 2.

An exploded view of connector assembly 48 is shown in FIG. 4. Stem portion 56 of weld cable connector 44 engages recess 98 of a conductive body 112 of receptacle 42. Pin 110 passes through conductive body 112 and engages groove 66 of weld cable connector 44. An exterior surface 114 of conductive body 112 includes a hex portion 116, a mid-planar portion 118, and threaded portion 90. An O-ring 122 passes over threaded portion 90 and partially across mid-planar portion 118. O-ring 122 is received in an annular groove 124 formed about mid-planar portion 118. First collar 80 has an opening 126 formed therethrough. Opening 126 is formed to allow conductive body 112 to be positioned therein with an end 128 of conductive body 112 positioned relatively flush with an end 130 of first collar 80. A key 132 is formed between a front section 134 and a rear section 136 of first collar 80. A ledge 138 is formed proximate a second end 140 of first collar 80 about rear section 136. A second O-ring 142 is positioned about ledge 138 of first collar 80. An opening 144 is formed through second collar 82 and is constructed to allow boss 84 to engage key 132 of first collar 80 thereby fixing the position of second collar 82 relative to first collar 80. When fully assembled, threaded portion 90 of conductive body 112 extends past an end 146 of second collar 82 and is engaged by nut 88 with washer 92 positioned between nut 88 and end 146 of second collar 82.

Figure 5:
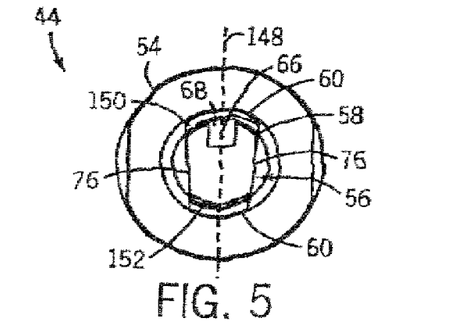
FIG. 5 is an end view of a first connector of the connector assembly taken along line 5-5 of FIG. 2.

As shown in FIG. 5, planar surfaces 76 truncate both the shank portion 58 and threaded portion 60 of weld cable connector 44. Additionally, planar surfaces 76 are skewed from parallel with a longitudinal plane of symmetry 148 such that threaded portion 60 is divided into a first threaded section 150 and a second threaded section 152. The skewing of planar surfaces 76 provides first threaded section 150 with a circumferential distance that is greater than a circumferential distance of second threaded section 152. First section 68 of groove 66 of shank portion 58 of weld cable connector 44 is generally aligned with longitudinal plane 148 and first threaded section 150.

Figure 6:
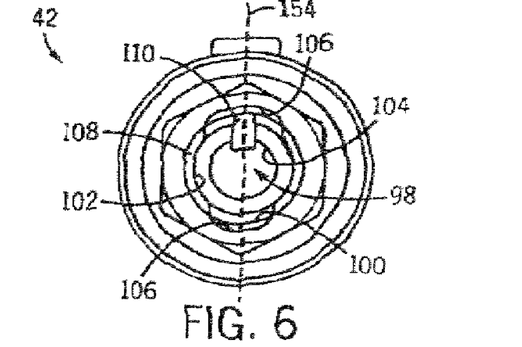
FIG. 6 is an end view of a second connector of the connector assembly taken along line 6-6 of FIG. 2.

Referring to FIGS. 5 and 6, upon insertion of stem 56 of connector 44 into recess 98 of receptacle 42, pin 110 slidingly engages groove 66 of weld cable connector 44. First threaded section 150 and second threaded section 152 pass through channels 109 of receptacle 42. Referring to FIG. 6, pin 110 is centered about a longitudinal plane 154 of receptacle 42. First threaded section 150 and second threaded section 152 are allowed to pass axially into recess 98 without interference of first threaded section 150 and second threaded section 152 with threaded portions 108 of receptacle 42.

Figure 7:
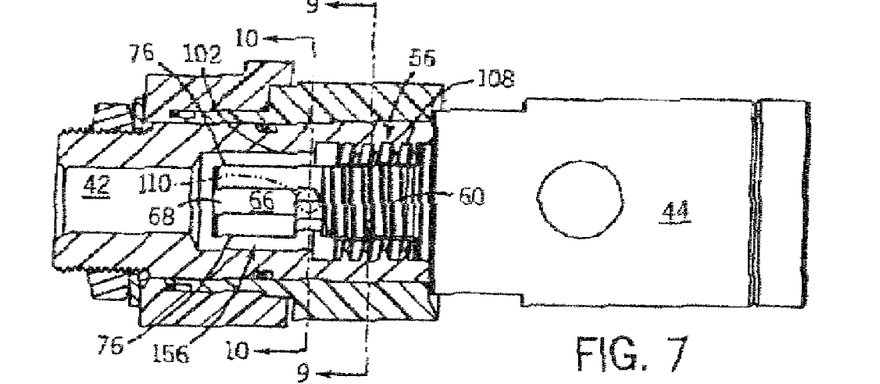
FIG. 7 is an elevational view of the connector assembly of FIG. 2 with the first connector inserted into the second connector which is shown in cross-section.

FIG. 7 shows connector 44 inserted into receptacle 42. Pin 110, shown in phantom, engages first portion 68 of groove 66 while threaded portion 60 of connector 44 passes freely through threaded portion 108 of receptacle 42. At this point there is no interference between threaded portion 60 of connector 44 and threaded portion 108 of receptacle 42.

Additionally a gap 156 is formed between planar surfaces 76 and second section 102 of recess 98.

Figure 8:
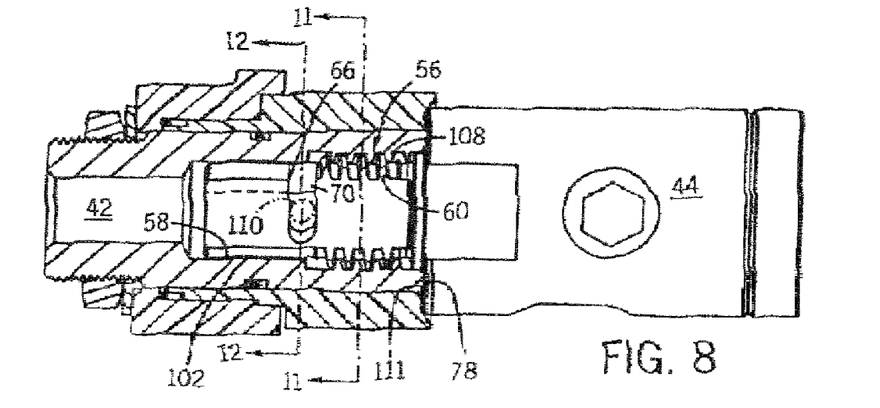
FIG. 8 is an elevational view of the connector assembly of FIG. 7 with the first connector rotated into engagement with the second connector.

Referring to FIG. 8, upon rotation of connector 44 relative to receptacle 42, pin 110 travels through second section 70 of groove 66 and threaded portion 60 of stem portion 56 of connector 44 engages threaded portion 108 of receptacle 42. The pin and groove engagement between receptacle 42 and shank portion 58 of connector 44 forms a first attaching means and the threaded engagement between threaded portions 60 of stem portion 56 of weld cable connector 44 and threaded portion 108 of receptacle 42 forms a second attaching means of the connector assembly. Furthermore, the threaded engagement between the threaded portions of the receptacle and the connector forms a contacting surface area that is greater than any contact area of the pin and groove engagement.

Figure 9:
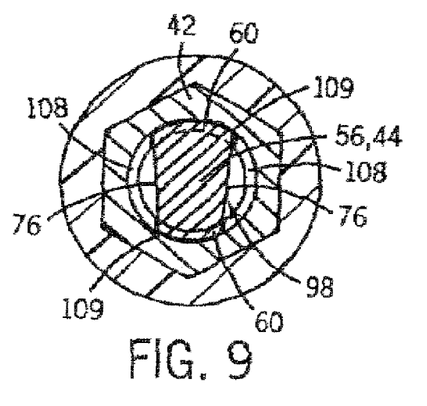
FIG. 9 is an end view of the connector assembly taken along line 9-9 of FIG. 7 with the first connector inserted into the second connector.
Figure 10:
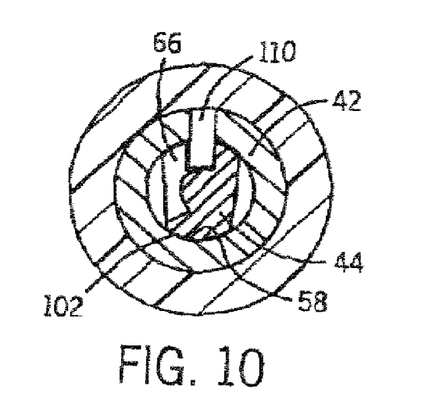
FIG. 10 is an end view of the connector assembly taken along line 10-10 of FIG. 7 with the pin of the second connector positioned in the groove of the first connector.
Figure 11:
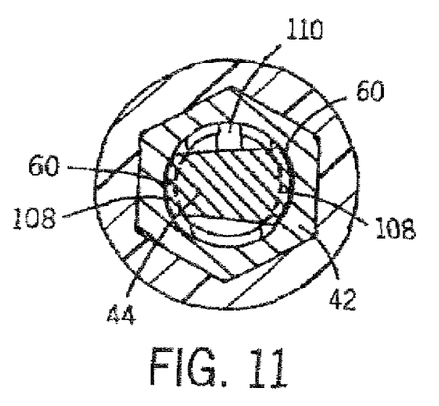
FIG. 11 is an end view of the connector assembly taken along line 11-11 of FIG. 8 with the threaded portion of the first and second connectors rotated into engagement.
Figure 12:
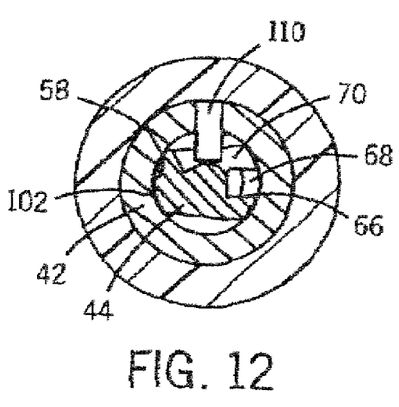
FIG. 12 is an end view of the connector assembly taken along line 12-12 of FIG. 8 with the pin and groove of the first and second connectors rotated to the engaged position.

FIG. 9 shows the relation of threaded portion 60 of stem portion 56 of connector 44 relative to threaded portion 108 of recess 98 upon insertion of stem portion 56 into recess 98. Channels 109 of receptacle 42 receive threaded portions 60 of connector 44 therein. Still referring to the inserted position, as shown in FIG. 10, pin 110 engages groove 66 of connector 44. Shank portion 58 of connector 44 is received within second section 102 of receptacle 42. FIGS. 11 and 12 show the engagement between connector 44 and receptacle 42 upon rotation of connector 44 relative to receptacle 42. As shown in FIG. 11, upon rotation of connector 44 relative to receptacle 42, threaded portions 60 of connector 44 threadingly engage threaded portions 108 of receptacle 42.

Referring to FIG. 12, pin 110 travels through circumferential second section 70 of groove 66 while maintaining electrical connectivity between shank portion 58 of connector 44 and second portion 102 of receptacle 42. As shown, approximately 90 degrees of rotation of connector 44 relative to receptacle 42 forms a quick connect electrical connector assembly that can quickly and efficiently be connected and disconnected. Upon rotation of connector 44 relative to receptacle 42, both the threaded portions 60, 108 of connector 44 and receptacle 42 and, as shown in FIG. 8, lip 78 of connector 44 and end 111 of receptacle 42, are brought into clamping engagement. The clamping engagement distributes the mechanical, electrical, and thermal loads of the connector assembly through the multiple thread and component face engagements of the connector assembly thereby providing increased power transmitting capability of the connector assembly. Additionally, engagement of pin 110 in groove 66 prevents rotation of plug 44 relative to receptacle 42 until stem 56 is fully engaged in recess 98 thereby preventing premature rotation of connector 44 relative to receptacle 42. Although shown as having a quarter-turn engagement, it is understood that the quick connector assembly preferably has an insertion to engagement rotation of less than approximately 180 degrees. Additionally, by constructing the connector and the receptacle of the connector assembly of a material having conductivity characteristics similar to copper and machineability characteristics similar to brass, such as a tellurium copper alloy or a sulfur copper alloy material, a relatively compact connector assembly can be formed that is capable of communicating approximately 700 amps through the connection with less than approximately 40 degrees of temperature change.

Preferably, the individual connectors of the quick-connect connector assembly are constructed from a material having electrical conductivity characteristics of approximately 80% to 85% of that of copper and machineability characteristics of 70% to 85% of that of free-cutting brass, wherein free-cutting brass has a conductivity of approximately 26% of that of copper. Additionally, due to the repeated use and the rugged operating conditions associated with welding-type devices, the connectors of the quick-connect connector assembly are constructed of a material having a yield strength of at least 40,000 pounds per square inch. Such a connector has an extended service life and is capable of repeated connection/disconnection with relatively minimal wear between the engaging surfaces of the connectors of the assembly. Such a construction forms a relatively compact connector assembly capable of transmitting high power levels required for certain welding applications. Additionally, it is further understood that constructing the connector assembly from a material other than those examples provided above, such as from a chromium copper alloy, is within the scope of the claims.

An alternate embodiment of connector assembly 48 is shown in FIGS. 13-17. As shown in FIG. 6, a connector assembly 170 includes a cable connector 172, a first connector, and a receptacle connector 174, a second connector. Receptacle connector 174 has a first collar 176 and a second collar 178 positioned about a body 180 of receptacle connector 174. A nut 182 and a washer 184 engage and are positioned about an outer threaded surface 186 of body 180 and secure receptacle connector 174 to a housing (not shown) generally positionable between first collar 176 and second collar 178. A boss 188 orients first collar 176 to second collar 178 and receptacle connector 174 to the housing. A passage 190 is formed through body 180 of receptacle connector 174 and includes a first section 192 having a pair of channels 194 interrupting a threaded portion 196 formed therein. A second section 198 forms a generally annular groove in passage 190 of body 180 and is disposed generally between first section 192 and a third section 200 of passage 190.

Figure 13:
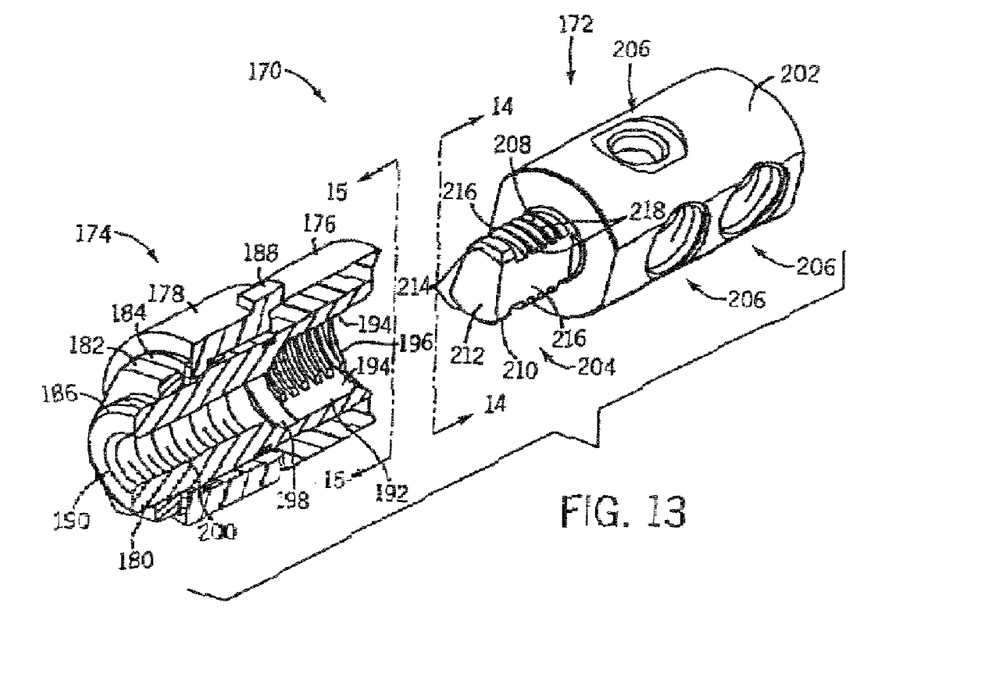
FIG. 13 is a perspective, partial cross-sectional view, of another embodiment of a quick connector assembly for use with the welding-type device shown in FIG. 1.

Cable connector 172 includes a collar portion 202 and a stem portion 204. A plurality of threaded recesses 206 are formed in collar portion 202 and constructed to receive a set screw (not shown) therein for securing a weld cable to cable connector 172. Stem portion 204 of cable connector 172 includes a threaded section 208 between collar portion 202 and a shank section 210. Shank section 210 is formed proximate an end 212 of cable connector 172. A pair of shoulders 214 are formed about shank section 210 and truncated by a pair of planar surfaces 216 located on generally opposite sides of stem portion 204. During connection of cable connector 172 to receptacle connector 174, shoulders 214 are constructed to pass through channels 194 of first section 192 of receptacle connector 174. Shoulders 214 are constructed to be received within second section 198 of body 180 of receptacle connector 174. Upon rotation between cable connector 172 and receptacle connector 174, shoulder 214 rotates within second section 198 of receptacle connector 174 and a plurality of threads 218 of threaded section 208 of cable connector 172 threadingly engage threaded portion 196 of receptacle connector 174. Such a construction securely connects cable connector 172 and receptacle connector 174 with relatively minimal rotation therebetween.

Figure 14:
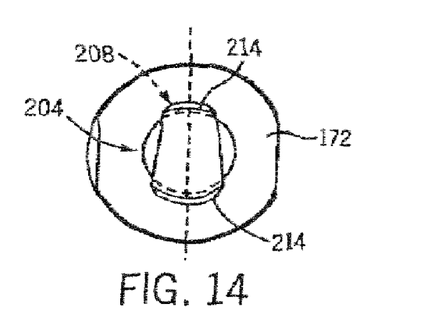
FIG. 14 is an end view of a first connector of the connector assembly taken along line 14-14 of FIG. 13.
Figure 15:
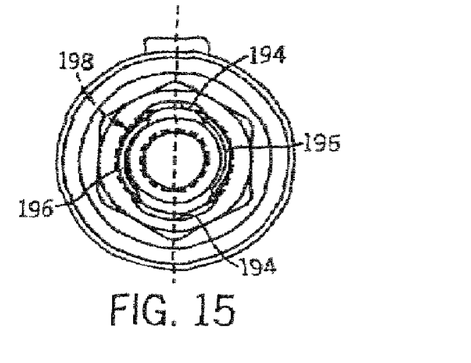
FIG. 15 is an end view of a second connector of the connector assembly taken along line 15-15 of FIG. 13.
Figure 16:
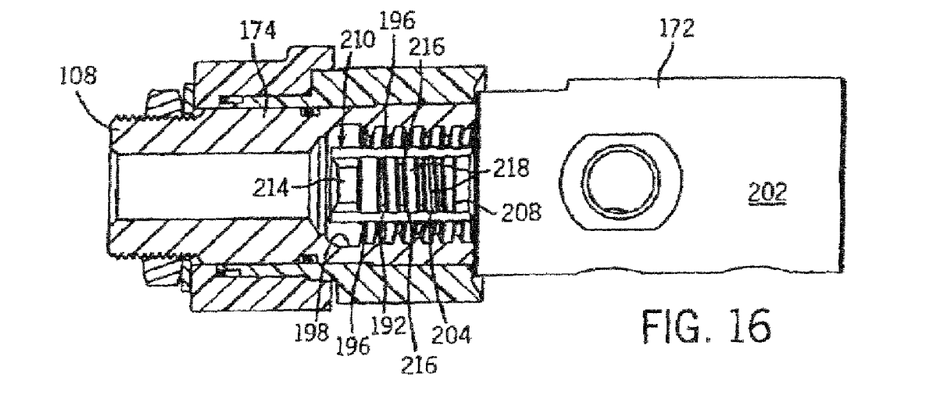
FIG. 16 is an elevational view of the connector assembly of FIG. 13 with the first connector inserted into the second connector which is shown in cross-section.

An end view of cable connector 172 is shown in FIG. 14. As shown in FIG. 14, shoulders 214 extend beyond threaded section 208 (shown in phantom) of stem portion 204, the importance of which will be described with respect to FIG. 17. An end view of receptacle connector 174 is shown in FIG. 15. As shown in FIG. 15, channels 194 interrupt threaded portions 196 of receptacle connector 174. The second section 198 (shown in phantom) has a diameter that is somewhat larger than an inner diameter of threaded portion 196. As shown in FIG. 16, stem portion 204 of cable connector 172 is constructed to be received within first section 192 and second section 198 of receptacle connector 174. Shoulders 214 pass beyond threaded portion 196 of receptacle connector 174 without interference therewith. Additionally, when just inserted into receptacle connector 174, plurality of threads 218 of threaded section 208 do not interfere with the plurality of threads of threaded portion 196.

Figure 17:
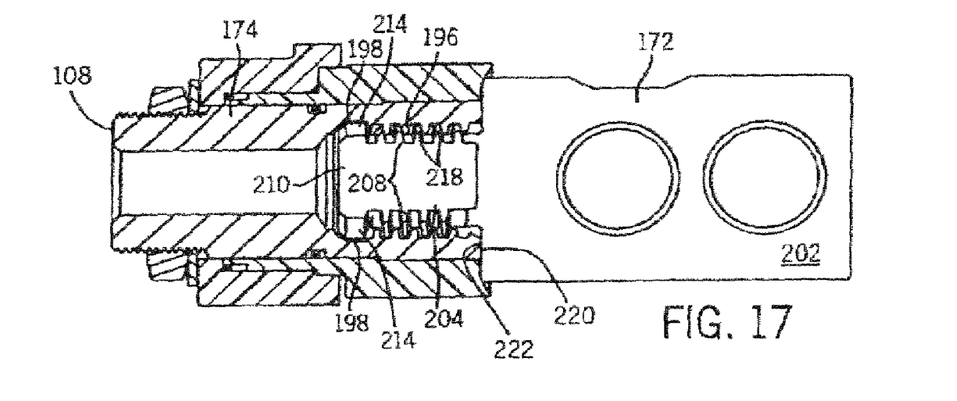
FIG. 17 is an elevational view of the connector assembly of FIG. 13 with the first connector and the second connector rotated into engagement.

Upon rotation of cable connector 172 relative to receptacle connector 174, as shown in FIG. 17, plurality of threads 218 of threaded section 208 of cable connector 172 threadingly engage the threads of threaded portion 196 of receptacle connector 174. Additionally, shoulders 214 rotate freely relative to second portion 198 of receptacle connector 174 and prevent the premature rotation of cable connector 172 relative to receptacle connector 174. The engagement between the threads of threaded sections 208 of cable connector 172 and threaded portion 196 of receptacle connector 174 form a clamping engagement both therebetween and between an end face 220 of cable connector 172 and an end face 222 of receptacle connector 174. The clamping engagement of the connector assembly provides multiple power conducting surfaces within the threads as well as a power conducting surface at the end faces of the cable connector and the receptacle connector.

Regardless of which of the above embodiments is employed, although each embodiment is shown as having a quarter-turn engagement, it is understood that each quick connector assembly preferably has an insertion to engagement rotation of less than approximately 180 degrees. Additionally, by constructing the connector and the receptacle of the connector assembly of a tellurium copper material, the connector assembly is capable of communicating approximately 700 amps through the connection with less than approximately 40 degrees of temperature change. Such a construction forms a connector assembly capable of transmitting high power levels required for certain welding applications.

Therefore, present invention includes a high-power quick connector assembly having a first connector and a second connector. The first connector has a collar portion connectable to a welding cable and a stem portion having a shank end and a threaded end. The second connector has a recess formed therein constructed to receive the stem portion of the first connector. The recess is constructed to engage the shank end and the threaded end of the first connector.

In another embodiment of the present invention, a quick connector assembly for a welding-type device has a cable adapter having a cable end connectable to a welding cable and a welding device end. A device adapter is constructed to engage the welding device end of the cable adapter and has a body having a first end and a second end. A recess extends into the body from the first end and has a threaded section formed in the recess proximate the first end. A smooth section is formed in the recess between the threaded section and the second end.

An alternate embodiment of present invention includes a high-power quick connector assembly having a receiver and a plug. The receiver is configured to be connected to a welding-type device and has a first inner diameter and a second inner diameter wherein the second inner diameter is greater than the first inner diameter. The plug is constructed to be connected to a weld cable and has a stud. The stud has a first outer diameter substantially similar to the first inner diameter of the receiver and a second outer diameter substantially similar to the second inner diameter of receiver. A plurality of threads is formed about the second outer diameter of the stud.

A further embodiment of the present invention includes a method of forming a high-power electrical connection. The method includes providing a receptacle having a first connection portion and a second connection portion and providing a plug having a first engagement portion constructed to electrically communicate with the first connection portion of the receptacle and a second engagement portion constructed to electrically communicate with the second connection portion upon rotation therebetween wherein a surface area of the first engagement portion is less than a surface area of the second engagement portion.

Another embodiment of the present invention includes a method of manufacturing a high-power quick connector assembly. The method includes forming a receiver having a first internal profile and a second internal profile and forming a plug having a first external profile constructed to pass the second internal profile of the receiver and engage the first internal profile of the receiver, and a second external profile constructed to engage the second internal profile of the receiver upon rotation therebetween.

An additional embodiment of the present invention includes a high-power quick connector assembly for welding-type apparatus having means for receiving a weld cable and means for connecting the receiving means to a power source. The connecting means includes first attaching means having a contact surface area and second attaching means having a contact surface area that is greater than the contact surface area of the first attaching means.

Another embodiment of the present invention has a connector assembly having a cable connector and an output connector. The cable connector is connectable to a weld cable and the output connector is electrically connectable to a power source configured to generate a power signal suitable for welding applications. At least one of the cable connector and the output connector are constructed from a tellurium copper material.

The present invention has been described in terms of the preferred embodiment, and it is recognized that equivalents, alternatives, and modifications, aside from those expressly stated, are possible and within the scope of the appending claims.

What is claimed is:

1. A quick connector assembly for a welding-type device comprising:
   a cable adapter connectable to a welding cable and having a cable end and a welding device end;
   a device adapter constructed to engage the welding device end of the cable adapter and comprising:
      a body having a first end and a second end;
      a recess extending into the body from the first end;
      a threaded section formed in the recess proximate the first end;
      a smooth section formed in the recess between the threaded section and the second end; and
      wherein the device adapter further comprises another recess extending into the body from the second end and fluidly connected to the first recess.

2. The quick connector assembly of claim 1 wherein at least one of the cable adapter and the device adapter are at least partially constructed from at least one of a tellurium copper alloy, a sulfur copper alloy, and a chromium copper alloy.

3. The quick connector assembly of claim 1 wherein the body of the device adapter further comprises a first threading formed about an outside surface about the second end and a second threading formed about a circumference of the another recess.

4. The quick connector assembly of claim 1 wherein the device adapter further comprises a ledge formed in the recess generally between the threaded section and the smooth section.

5. The quick connector assembly of claim 1 wherein the cable adapter and the device adapter are fully connectable within one wrist-turn rotation therebetween.

6. The quick connector assembly of claim 1 wherein the threaded section of the recess of the device adapter has a pair of channels extending across the threaded section, the channels having a diameter similar to a diameter of the smooth section formed in recess and less than an inner diameter of the threaded section.

7. The quick connector assembly of claim 1 wherein the device adapter further comprises a first channel and a second channel extending axially through the threaded section formed in the recess.

8. The quick connector assembly of claim 7 wherein the first and second channels are on generally opposite sides of the threaded section of the recess.

9. The quick connector assembly of claim 1 wherein the welding device end of the cable adapter further comprises an unthreaded portion and a threaded portion.

10. The quick connector assembly of claim 9 wherein the unthreaded portion is closer to an end of the cable adapter than the threaded portion.

11. The quick connector assembly of claim 1 wherein the device adapter is constructed to be connected to a device capable of outputting a power signal suitable for welding and the cable adapter is arranged to communicate the power signal to the welding cable.

12. The quick connector assembly of claim 11 wherein the power signal suitable for welding is capable of sustained currents of approximately 700 amps.

13. A quick connector assembly for a welding-type device comprising:
a cable adapter connectable to a welding cable and having a cable end and a welding device end;
a device adapter constructed to engage the welding device end of the cable adapter and comprising:
a body having a first end and a second end;
a recess extending into the body from the first end;
a threaded section formed in the recess proximate the first end;
a smooth section formed in the recess between the threaded section and the second end; and
wherein the welding device end of the cable adapter includes a shouldered shank at an end thereof and a threaded section between the shouldered shank and the cable end of the cable adapter.

14. The quick connector assembly of claim 13 wherein the shouldered shank includes a pair of shoulders extending from generally opposite sides thereof.

15. The quick connector assembly of claim 13 further comprising a pair of planar surfaces extending along generally opposite sides of the shouldered shank and the threaded section of the cable adapter.

16. The quick connector assembly of claim 13 wherein the shouldered shank of the cable adapter is constructed to pass uninterruptedly across the threaded section of the device adapter and engage the smooth section upon rotation therebetween.

17. The quick connector assembly of claim 13 wherein an outer diameter of the shouldered shank is greater than an outer diameter of the threaded section of the cable adapter and is greater than an inner diameter of the threaded section of the device adapter.

18. A connector assembly comprising:
a cable connector connectable to a weld cable;
an output connector electrically connectable to a power source configured to generate a power signal suitable for welding applications;
an insulator positioned about the output connector and constructed to be secured to a housing positioned about the power source, the insulator including a first body having a boss and a second body having a recess, the boss of the first body constructed to engage the housing and be snuggly received in the recess of the second body; and
wherein at least one of the cable connector and output connector are constructed from at least one of a tellurium copper material, a sulfur copper material, and a chromium copper material.

19. The connector assembly of claim 18 wherein the output connector is engageable with the cable connector from an initial position to a fully engaged position in less than 180 degrees of rotation.

20. The connector assembly of claim 18 wherein the power source is constructed to generate a power signal suitable for welding with up to approximately 700 amps.

21. The connector assembly of claim 18 wherein the cable connector further comprises a cable portion connectable to the weld cable and a stud portion engageable with the output connector, the stud portion having an unthreaded portion and a threaded portion.

22. The connector assembly of claim 18 wherein the output connector has a path formed therethrough constructed to circulate a cooling flow through the connector assembly.

23. The connector assembly of claim 22 wherein the output connector further comprises an unthreaded portion constructed to engage the unthreaded portion of the cable connector and a threaded portion constructed to engage the threaded portion of the cable connector.

24. The connector assembly of claim 23 wherein the unthreaded portion of the cable connector further comprises a pair of shoulders extending therefrom constructed to snuggly engage the unthreaded portion of the output connector upon rotation therebetween.

25. The connector assembly of claim 24 wherein the threaded portion of the output connector further comprises a pair of channels constructed to allow uninterferred passage of the pair of shoulders of the cable connector through the threaded portion of the output connector.

26. The connector assembly of claim 24 wherein the cable connector is not rotatable relative to the output connector when the pair of shoulders are generally aligned with the threaded portion of the output connector.

27. The connector assembly of claim 24 wherein an outer diameter of the pair of shoulders is greater than an outer diameter of the threaded portion of the stud portion of the cable connector.

28. A weld-power quick connector comprising:
a receptacle having a recess formed therein;
a cable connector constructed to connect to a weld cable;
a stud extending from the cable connector constructed to be received in the recess of the receptacle, the stud having a threaded portion and a shoulder portion wherein the shoulder portion is located closer to an end of the cable connector than the threaded portion and has a diameter that is greater than an outer diameter of the threaded portion.

29. The weld-power quick connector of claim 28 wherein the threaded section of the recess engages the threaded portion of the stud and the smooth section engages the shoulder portion of the stud upon rotation of the cable connector relative to the receptacle thereby receiving the cable connector to the receptacle.

30. The weld-power quick connector of claim 28 wherein a pair of generally planar surfaces truncate generally opposite sides of the stud of the cable connector.

31. The weld-power quick connector of claim 28 wherein the cable connector is engageable with the receptacle from an inserted position to a locked position with a single-grip rotation therebetween.

32. The weld-power quick connect of claim 28 wherein the shoulder portion of the stud has an outer diameter that is greater than an inner diameter of a threaded section of the recess of the receptacle and is engageable therebehind.

33. The weld-power quick connector of claim 28 wherein at least one of the receptacle and cable connector are constructed from a tellurium copper material.

34. The weld-power quick connector of claim 28 wherein the recess has a threaded section and smooth section wherein the threaded section is located closer to an end of the receptacle than the smooth section.

35. The weld-power quick connector of claim 34 further comprising at least one channel formed in the threaded section of the recess constructed to allow passage of the shoulder portion of the stud therethrough.

* * * * *